US008112976B1

(12) United States Patent
Kallevig et al.

(10) Patent No.: US 8,112,976 B1
(45) Date of Patent: Feb. 14, 2012

(54) SELECTIVELY USABLE ROLLER STRIPER FOR LAWN MOWER

(75) Inventors: Jeffrey B. Kallevig, Eden Prairie, MN (US); Thomas K. Bricko, Lakeville, MN (US)

(73) Assignee: The Toro Company, Bloomington, MN (US)

( * ) Notice: Subject to any disclaimer, the term of this patent is extended or adjusted under 35 U.S.C. 154(b) by 682 days.

(21) Appl. No.: 11/588,114

(22) Filed: Oct. 26, 2006

(51) Int. Cl.
*A01D 34/00* (2006.01)
(52) U.S. Cl. ............ 56/17.4; 56/1; 56/16.7; 56/DIG. 20
(58) Field of Classification Search ............... 56/1, 17.4, 56/16.7, DIG. 20
See application file for complete search history.

(56) References Cited

U.S. PATENT DOCUMENTS

| 261,638 | A | | 7/1882 | Stanly | |
|---|---|---|---|---|---|
| 2,973,613 | A | * | 3/1961 | Hagedorn | ...................... 56/10.5 |
| 3,190,061 | A | | 6/1965 | Gilbertson | |
| 3,706,186 | A | | 12/1972 | Hurlburt et al. | |
| 4,159,613 | A | * | 7/1979 | Knudson et al. | ............... 56/11.3 |
| 5,870,888 | A | | 2/1999 | Pugh | |
| 6,523,335 | B2 | * | 2/2003 | Vanderipe | ...................... 56/16.7 |
| 6,962,039 | B2 | * | 11/2005 | Greenhoe | ...................... 56/16.7 |
| 7,024,845 | B2 | * | 4/2006 | Kallevig et al. | ................. 56/17.4 |
| 7,237,374 | B2 | * | 7/2007 | Sugden et al. | ................... 56/249 |
| 7,478,681 | B2 | * | 1/2009 | Alston | ............................. 172/21 |
| 2005/0000203 | A1 | * | 1/2005 | Rogers et al. | ................... 56/16.7 |
| 2005/0066642 | A1 | | 3/2005 | Sugden et al. | |

* cited by examiner

*Primary Examiner* — Alicia Torres
(74) *Attorney, Agent, or Firm* — James W. Miller

(57) ABSTRACT

A rotary cutting deck has a roller striper along a rear side thereof. The roller striper comprises a pivotal frame that rotatably journals a roller made from a plastic roller body. Torsion springs surround the pivots for the frame. The springs put enough downforce on the plastic roller body to lay the cut grass over in a rearward direction as the cutting deck moves forwardly over the ground. The roller striper can be selectively moved into and out of engagement with the ground by a pivotal handle that can be manipulated by an operator from a seat of the lawn mower on which the cutting deck is installed.

9 Claims, 5 Drawing Sheets

SELECTIVELY USABLE ROLLER STRIPER FOR LAWN MOWER

TECHNICAL FIELD

This invention relates to a rotary cutting deck for a riding lawn mower. More particularly, this invention relates to a roller striper at the rear of the cutting deck for laying the cut grass down behind the cutting deck.

BACKGROUND OF THE INVENTION

Rotary cutting decks have one or more cutting blades that rotate in horizontal cutting planes. The cutting blades have sharpened cutting edges that cut grass as the blades are so rotated. Such cutting decks are often mounted on riding lawn mowers that have a seat for carrying an operator. Various controls are available to the operator for allowing the operator to drive and steer the lawn mower, to start and stop the operation of the blades, to raise and lower the cutting deck, etc.

It is aesthetically desirable in some situations to mow the grass in a striped pattern comprising alternating light and dark stripes. For example, baseball fields and other sports fields are often mowed in a striped pattern. A common way to produce such stripes is to mount a rotatable, ground engaging roller at the rear of the cutting deck.

As the lawn mower and cutting deck move forwardly over the ground, the roller bends the stems of the cut grass to lay the cut grass over. When the mower performs a 180° turn and travels in opposite directions in adjacent swaths, the cut grass will be laid over in opposite directions. Light will reflect differently off the adjacent swaths of cut grass where the cut grass has been laid over in opposite directions. This is what produces the alternating light and dark stripes.

The roller used to stripe the grass must engage the grass with sufficient force to bend the stems of the cut grass over as the cutting deck moves forwardly. Thus, known roller stripers typically comprise metallic rollers that are fairly heavy since gravity is what keeps such rollers engaged with the cut grass. However, if the mower drives along a paved surface, such as a sidewalk or street, the metallic rollers are very noisy when rolling over such a paved surface.

In addition, such rollers can be dented or otherwise damaged if they bang or hit against a curb with too much force when the mower is driven up over a curb as often happens. The operator must either avoid driving the mower over such a curb or must climb the curb slowly to minimize the chances of damaging the roller. Both of these damage avoiding measures run counter to the normal driving practices of many operators.

Another problem with many known roller stripers is the fact that they are mounted on the cutting deck in an operative position using fixed support brackets or roller journals. Thus, there is no way for an operator who is seated on the seat of the lawn mower to easily put the roller striper into operation or to take it out of operation. The operator could stop and uninstall the roller striper by unbolting it from the cutting deck and then later reinstall the roller striper. However, this is obviously far too cumbersome a procedure to selectively place the roller striper into operation or to remove it from operation. A simpler way is needed to provide the operator of a riding lawn mower with some control over when he or she uses a roller striper.

Grass conditions vary greatly with grass variety, moisture content season of the year, and many other factors. Several conditions promote the adhesion of grass clippings onto the surface of a striper roller. The buildup of clippings on the surface of the roller is undesirable. The compacted layer of clippings adhering to the roller surface may release from the roller surface on occasion. When the compacted layer of clippings releases from the roller surface, the compacted mat will become an unsightly patch deposited onto the lawn. The deposit of a compacted layer or mat of compacted grass clippings may smother the growing grass under the compacted layer, producing a long lasting blemish on the lawn.

SUMMARY OF THE INVENTION

One aspect of this invention relates to an improved rotary cutting deck having at least one rotary cutting blade for mowing grass. The improvement relates to a roller striper for pressing or laying down cut grass in a stripe behind the cutting deck. The roller striper comprises a frame movably carried on a rear of the cutting deck. A plastic roller body is rotatably carried on the frame for rotation about a substantially horizontal pivot axis. A spring acts between the cutting deck and the frame for pressing downwardly on the frame with a force sufficient to cause the plastic roller body to lay the cut grass down.

Another aspect of this invention relates to an improved rotary cutting deck having at least one rotary cutting blade for mowing grass. The improvement relates to a roller striper for pressing or laying down cut grass in a stripe behind the cutting deck. The roller striper comprises a rotatable, ground engaging roller that is movably mounted on the cutting deck for lifting into a raised, non-operative position out of contact with the ground and for lowering into a lowered, operative position in engagement with the ground. A pivotal handle is carried on the cutting deck for moving the roller between the raised and lowered positions thereof. The handle has a top end that is located relative to a pivot for the handle such that the top end of the handle lowers when the roller moves to its lowered positions and the top end of the handle lifts when the roller moves to its raised position.

Yet another aspect of this invention relates to an improved rotary cutting deck having at least one rotary cutting blade for mowing grass. The improvement relates to a roller striper for pressing or laying down cut grass in a stripe behind the cutting deck. The roller striper comprises a frame movably carried on a rear of the cutting deck. A roller body is rotatably carried on the frame for rotation about a substantially horizontal pivot axis. The frame has an angled edge located closely adjacent an outer diameter of the roller body to scrape grass clippings off the outer diameter of the roller body.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
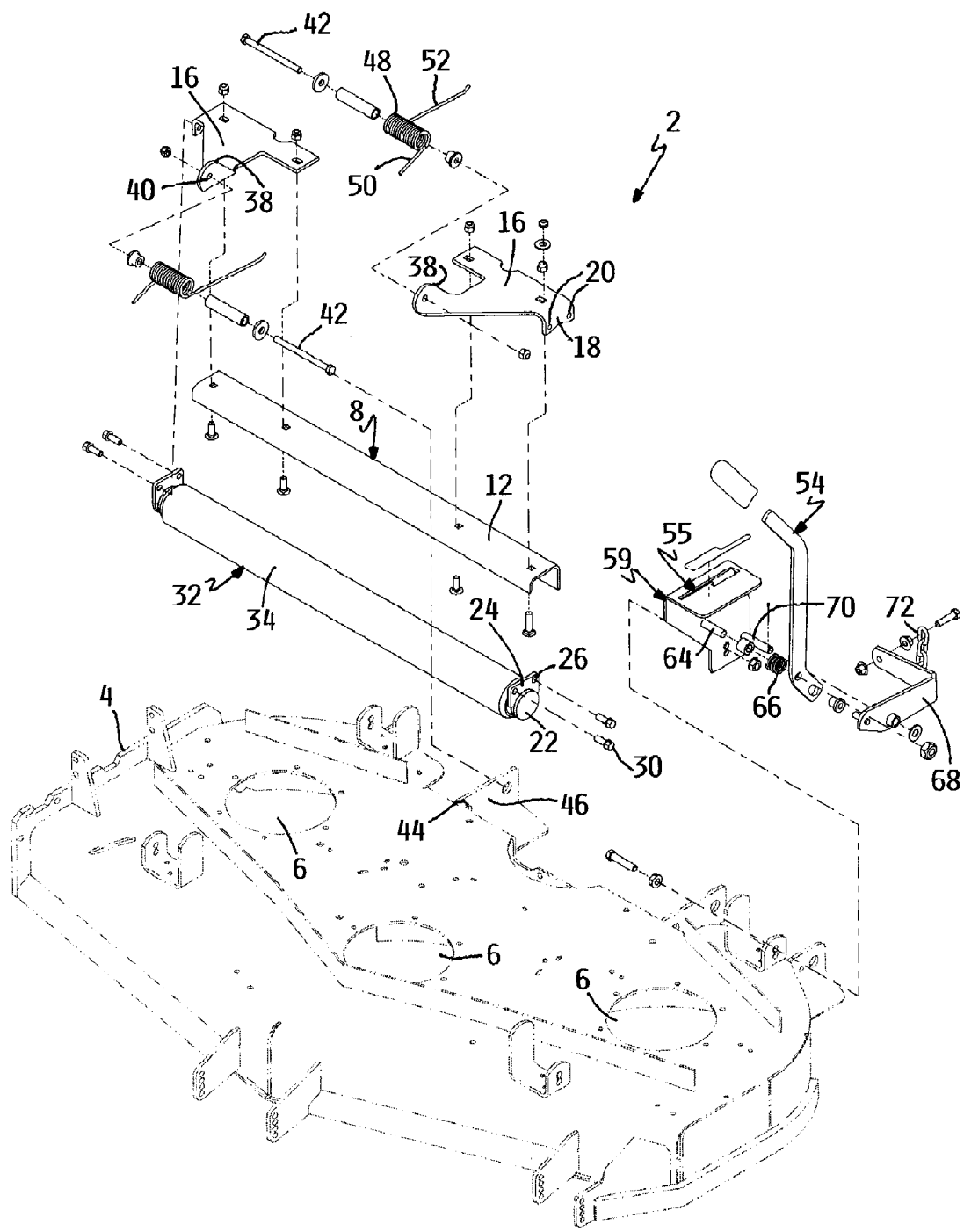
FIG. 1 is a perspective view of a roller striper according to this invention, particularly illustrating the roller striper in an exploded form relative to a cutting deck on which the roller striper is carried.

One embodiment of a roller striper according to this invention is illustrated as 2 in the drawings. Roller striper 2 mounts to the rear of a rotary cutting deck 4 that will be carried on a riding lawn mower (not shown). Cutting deck 4 is wide enough to support a plurality of rotary cutting blades that include a front cutting blade that is offset or staggered forwardly of a pair of side cutting blades. While the cutting blades themselves are not shown in FIG. 1, the apertures 6 are shown in the top of cutting deck 4 which receive the spindles that drive or rotate the blades. Cutting deck 4 is mounted to the lawn mower such that cutting deck 4 is generally supported close to the operator's seat on the lawn mower.

Roller striper 2 comprises a downwardly facing, U-shaped frame 8. Frame 8 includes a relatively short vertical rear wall 10, a horizontal top wall 12, and a vertical front wall 14 that is longer than rear wall 10. A pair of mounting plates 16 are bolted to frame 8 to form part of frame 8. Each mounting plate 16 is bolted to top wall 12 of frame 8 adjacent one end of top wall 12. Thus, mounting plates 16 form a part of frame 8.

Each mounting plate 16 has an outer end 18 that is downturned and wraps around one end of top wall 12. The downturned outer end 18 of each mounting plate 16 carries a pair of mounting holes 20 to secure a pair of roller journals or hubs 22 thereto. Hubs 22 include an upwardly extending mounting flange 24 having a pair of holes 26 that are spaced apart similarly to mounting holes 20 in outer ends 18 of mounting plates 16. Hubs 22 can thus be bolted to outer ends 18 of mounting plates 16 by bolts 30.

Figure 5:
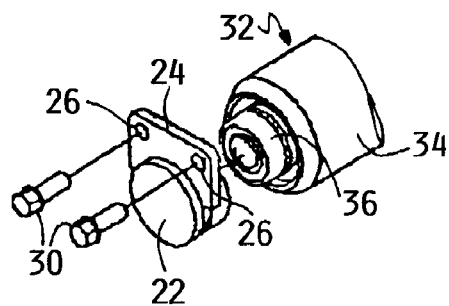
FIG. 5 is a perspective view of one end of the roller of the roller striper shown in FIG. 1, particularly illustrating the stub shaft of the roller and the hub that rotatably journals the stub shaft of the roller.

A rotatable ground engaging roller 32 includes a roller body 34 having outwardly extending shafts 36 at each end thereof. See FIG. 5. Preferably, roller body 34 is a plastic roller body molded from a polyethylene plastic. See FIG. 6. Shafts 36 comprise metallic shafts that may either be individual stub shafts or opposite ends of a through shaft. Roller body 34 could be integrally molded onto shafts 36 or roller body 34 could be separately formed and be at least partially or completely hollow to allow shaft(s) 36 to be pressed into roller body 34.

Figure 6:
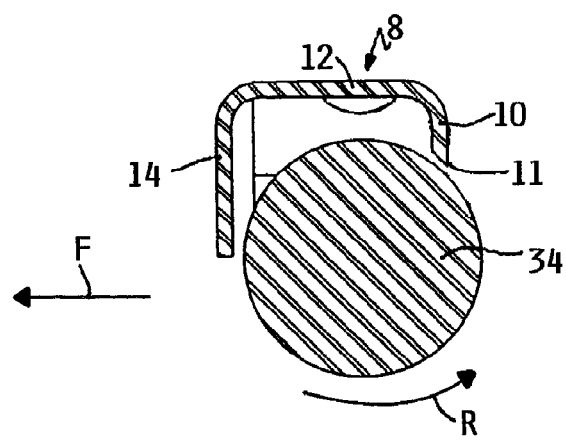
FIG. 6 is a diagrammatic cross-sectional view through portions of the roller striper of FIG. 1.

Shafts 36 rotatably journal roller body 34 in hubs 32 since each stub shaft 36 is pressed into and held tightly within the inner race of a ball bearing assembly (not shown) or the like contained within hub 32. Thus, as cutting deck 4 moves over the ground and roller 32 engages the ground, roller body 34 will rotate relative to hubs 22 and relative to frame 8 about a substantially horizontal pivot axis defined by the centerline of hubs 22. As shown in FIG. 6, when cutting deck 4 is moving forwardly as denoted by the arrow F, roller 32 will rotate rearwardly in the direction of the arrow R at the bottom of roller 32, i.e. where roller 32 contacts the cut grass.

Each mounting plate 16 has a forwardly extending ear 38 with a hole 40. A pair of pivot pins 42 extend through holes 44 in a pair of fixed flanges 46 on the rear of cutting deck 4 with pivot pins 42 then extending on through holes 40 in ears 38 of mounting plates 16. Thus, roller 32 is pivotally carried on the rear of cutting deck 4 by virtue of the aligned pivot pins 42 and their passage through ears 38 on mounting plates 16. The pivotal mounting of roller 32 is to allow roller 32 to be selectively disposed either in a lowered operative position in which roller 32 engages the ground or in a raised non-operative position in which roller 32 is lifted out of contact with the ground.

A torsion spring 48 is placed around each pivot pin 42. Torsion spring 48 has a front leg 50 that hooks beneath some part of cutting deck 4 and a rear leg 52 that extends rearwardly to engage on top of frame 8 of roller striper 2. Torsion springs 48 are designed to put a downforce on frame 8 of roller 32 to bias roller 32 downwardly. This downforce on frame 8 of roller 32 is present in both the raised non-operative position of roller 32 as well as the lowered operative position.

Roller striper 2 includes a pivotal handle 54 for moving roller 32 between its raised non-operative position and its lowered operative position. Handle 54 moves back and forth within a fore-and-aft extending longitudinal slot 55 in a fixed handle mounting bracket 59 provided on cutting deck 4. Slot 55 includes a narrower front portion 56, a wider rear portion 57, and a rearwardly extending catch or lip 58 at the junction of the front and rear slot portions 56 and 57. Handle mounting bracket 59 is L-shaped having a vertical wall 60 that is bolted to cutting deck 4 and a horizontal top wall 62 containing longitudinal slot 55.

Handle 54 is pivotally mounted on vertical wall 60 of handle mounting bracket 59 by a pivot pin 64. A compression spring 66 is secured around pivot pin 64 of handle 54. Compression spring 54 extends between vertical wall 60 of handle mounting bracket 59 and one side of handle 54. Compression spring 54 thus exerts a sidewards biasing force against handle 54.

Figure 3:
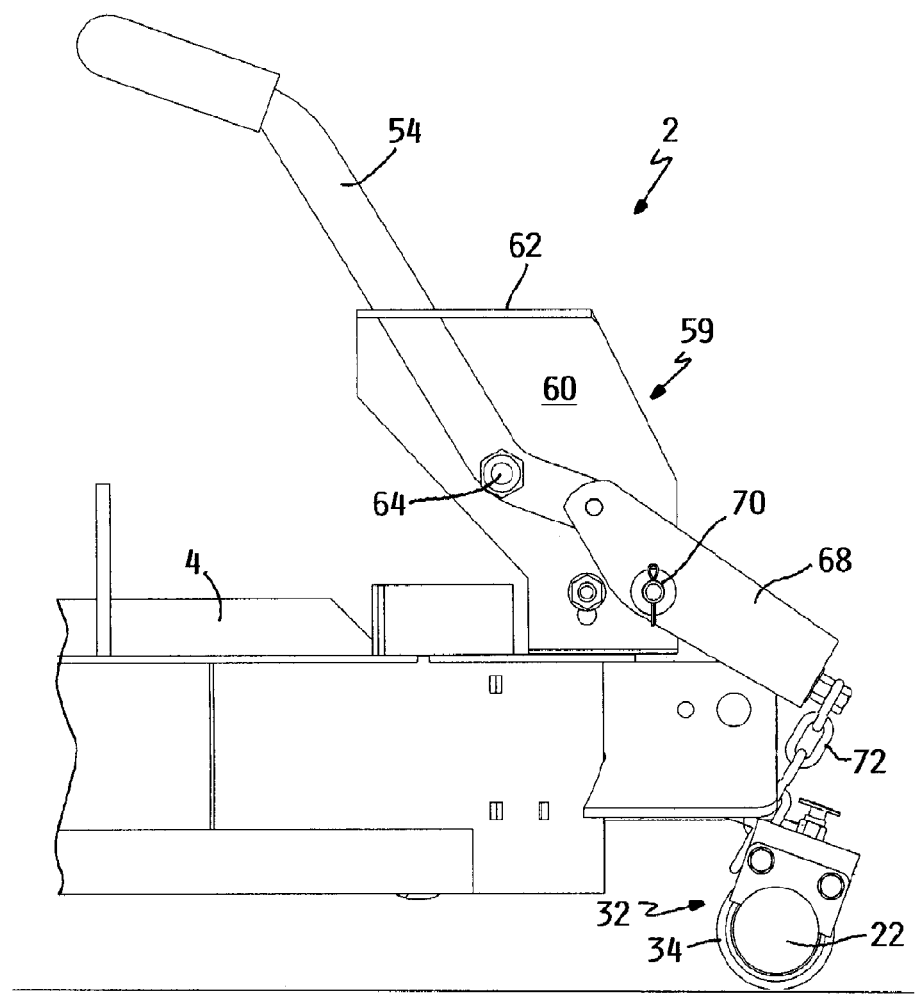
FIG. 3 is a side elevational view of the roller striper of FIG. 1, particularly illustrating the roller striper in a lowered operative position relative to the deck with the vertical front wall of the frame being omitted for the purpose of clarity.
Figure 4:
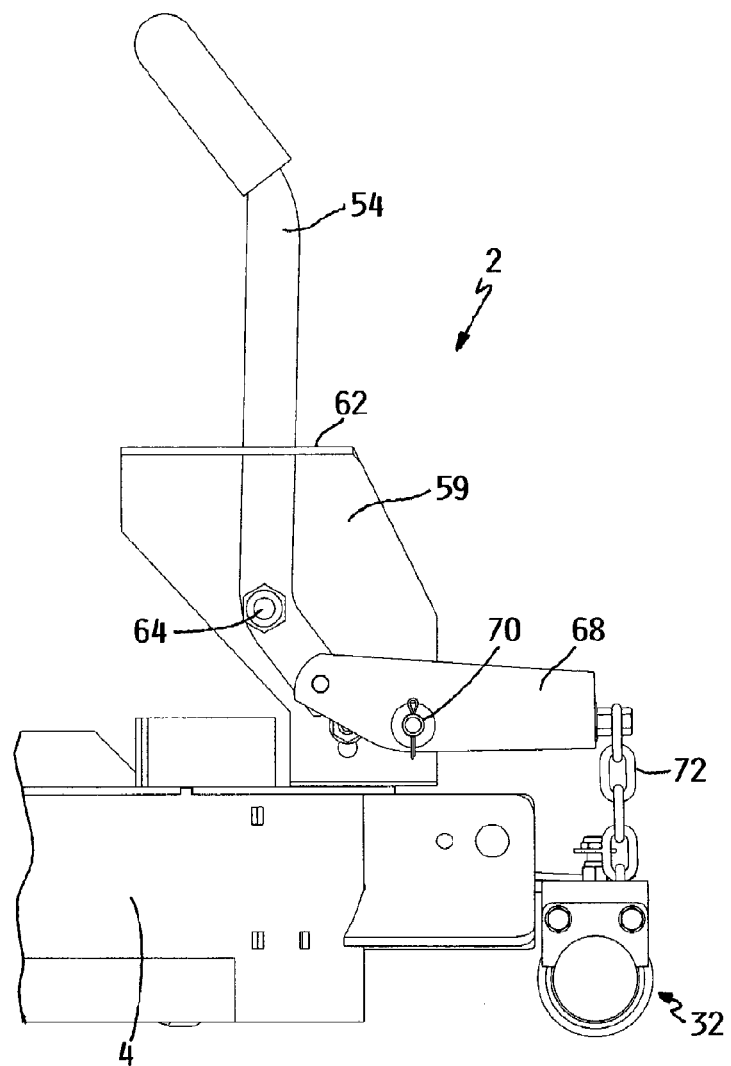
FIG. 4 is a side elevational view similar to FIG. 3, but showing the roller striper in a raised non-operative position relative to the deck.

As shown in FIGS. 3 and 4, handle 54 has a lower end that is located rearwardly and below the pivot pin 64 on which handle 54 pivots. The lower end of handle 54 is pivotally connected to an L-shaped link 68. Link 68 is itself pivotally connected to vertical wall 60 of handle mounting bracket 59 for movement about another pivot pin 70. The free end of link 68 is coupled by a chain 72 to the top of frame 8 of roller 32, i.e. the lowermost link in chain 72 is fixed around one of the bolts that holds one mounting plate 16 to frame 8 of roller 32. Thus, handle 54 is connected to roller 32 through link 68 and chain 72.

When handle 54 is pushed all the way forwardly in slot 55 in handle mounting bracket 59 as shown in FIG. 3, handle 54 and link 68 are rotated so that their connected ends are moved somewhat over the centerline of the two pivot pins 64 and 70. Link 68 has been rotated downwardly to allow roller 32 to move downwardly relative to cutting deck 4 into engagement with the ground. Thus, an operator sitting on the seat of the lawn mower need only push forwardly on handle 54 to lower roller 32. This pushing action also lowers the top of handle 54.

Figure 2:
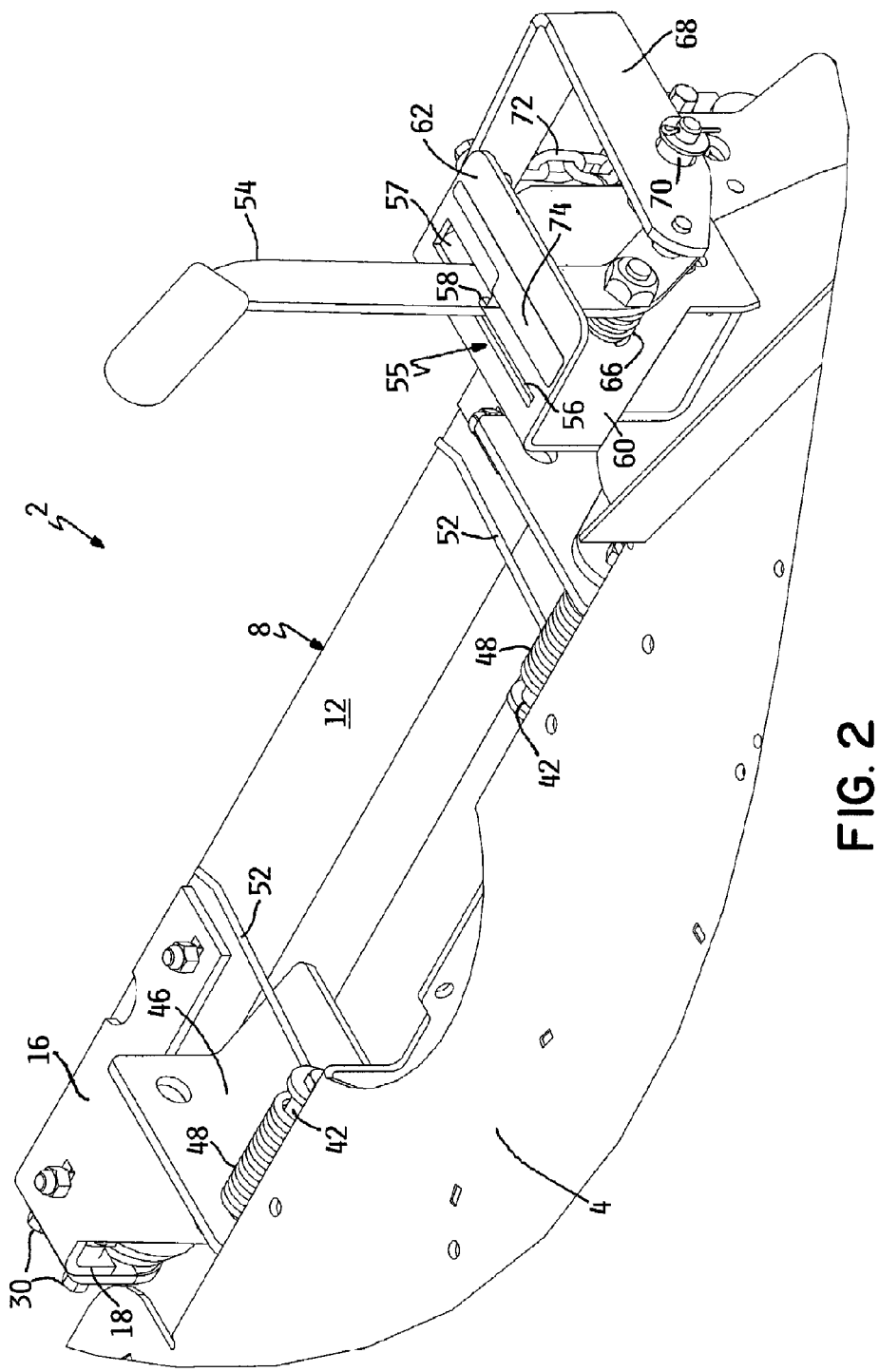
FIG. 2 is a perspective view of the roller striper of FIG. 1, particularly illustrating the roller striper in an assembled form attached to the rear of a cutting deck.

If on the other hand the operator wishes to raise roller 32, he need only pull back on handle 54 to retract handle 54 rearwardly into the wider rear portion 57 of slot 55. The operator can then push outwardly on handle 54 against the bias of spring 66 to move the handle sideways in wider rear portion 57 until handle 54 is out of alignment with the front portion of slot 55. Handle 54 has a loose fit on pivot pin 64 to allow handle 54 to be rocked sidewardly in this manner. The operator then nudges handle 54 forwardly slightly until the front edge of handle 54 overlies catch 58. If the operator then lets go of handle 54, handle 54 will then be retained by the bias of spring 66 in the wider rear portion 57 of slot 55 up against catch 58. Note that FIG. 2 shows handle 54 before it has been moved far enough back in slot 55 to clear catch 58 and thus handle 54 has not yet been rocked sidewardly in FIG. 2 or nudged forwardly as described above.

The above-described motion of handle 54 into the wider rear portion 57 of slot 55 causes handle 54 and link 68 to pivot until they reach the position shown in FIG. 4. In this position, link 68 has been lifted up and roller 32 has been lifted up into its raised non-operative position. In this position, roller 32 is maintained well above the ground.

Thus, an operator who is sitting on the seat of the lawn mower can easily and selectively place roller 32 into or out of operation simply by manipulating handle 54. The direction the operator needs to move handle 54 is correlated to the direction of motion of roller 32. To lower roller 32 into engagement with the ground, the operator pushes forwardly on handle 54 which lowers the top of handle 54 relative to the operator. Conversely, the operator pulls back on handle 54 to lift the top of handle 54 in order to lift up on roller 32. Thus, the operator intuitively knows how to operate roller 32 due to the correspondence or correlation between the motion of handle 54 and the desired motion of roller 32. In addition, a decal 74 bearing suitable instructing indicia could be placed on handle mounting bracket 59 to visually instruct the operator in the proper motion of handle 54.

The use of torsion springs 48 ensures that a spring force is used on roller 32 tending to bias roller 32 downwardly. Since roller body 34 is plastic, its weight alone would not be enough to ensure that roller body 34 would engage the cut grass with enough force to bend and lay the cut grass over as is necessary to produce a striping effect. The spring force is adjusted to ensure roller 32 engages the cut grass with sufficient force. In addition, the spring force helps roller 32 remain in engagement with the ground and not bounce or bob over the ground as the lawn mower drives across the ground. This ensures a more even and consistent stripe.

Rear wall 14 of frame 8 is positioned closely adjacent a rear side of roller body 34 at about the midpoint of roller body 34 as shown in FIG. 6. Rear wall 14 acts as a scraper to scrape off any grass clippings or debris that tends to accumulate on the outer diameter of roller body 34.

Roller striper 2 of this invention has various advantages. It can be easily placed into or taken out of operation by an operator sitting on the seat of the lawn mower simply by pivoting handle 54. The direction of motion of handle 54 is related to the desired direction of movement of roller 32, namely one pushes down on handle 54 to lower roller 32 and one lifts up on handle 54 to raise roller 32.

In addition, the use of a plastic roller makes roller striper much quieter if it should roll in contact with a paved surface. Also, it is less prone to being damaged if it is driven up over a curb. Plastic roller 32 can be made with sufficient flexibility that it will bend if need be when going up over a curb and will then restore itself to its usual shape once the curb has been passed. Springs 48 ensure though that plastic roller 32 engages the cut grass with enough force to properly lay the cut grass down and produce a reliable stripe.

Referring to FIG. 6, rear wall 10 of frame 8 has a sharp, angled lower edge 11 that is approximately tangent to the outer diameter of roller body 34 at a spot located between the top and the rear of roller body 34. There is only a minimal 0.06" of clearance between lower edge 11 and the outer diameter of roller body 34 at the point of closest approach between the two. Lower edge 11 of rear wall 10 acts as an effective scraper to prevent a thick layer of grass clippings or other debris from building up on the outer diameter of roller body 34. Thus, the scraper function built into frame 8 prevents a thick, compacted mat of grass clippings from building up on roller body 34 and then subsequently falling off onto the lawn.

Front wall 14 is located ahead of the front of roller body 34 and is spaced further away from the outer diameter of roller body 34, i.e. 0.12" (or further) instead of 0.06". Thus, the few grass clippings that get by the scraper formed by lower edge 11 of rear wall 10 and adhere to the outer diameter of roller body 34 will be able to more easily pass by front wall 14. This extra front wall clearance prevents such grass clippings from being scraped off by front wall 14 and then building up inside frame 8 above roller body 34.

Various modifications of this invention will be apparent to those skilled in the art. Thus, the scope of this invention is to be limited only by the appended claims.

The invention claimed is:

1. An improved rotary cutting deck having at least one rotary cutting blade for mowing grass, wherein the improvement relates to a roller striper for pressing or laying down cut grass in a stripe behind the cutting deck, which comprises:
   (a) a frame movably carried on a rear of the cutting deck;
   (b) a roller body rotatably carried on the frame for rotation about a substantially horizontal rotational axis;
   (c) a spring acting between the cutting deck and the frame for pressing downwardly on the frame with a force sufficient to cause the roller body to lay the cut grass down;
   (d) a bracket that is fixed to the cutting deck with the bracket having a vertical wall and a horizontal top wall containing a fore-and-aft extending longitudinal slot, wherein the slot has a narrower front portion and a wider rear portion; and
   (e) a handle that is pivotally mounted on the vertical wall of the bracket by a substantially horizontal pivot pin with a compression spring being located around the pivot pin with the spring acting between the vertical wall of the bracket and one side of the handle to exert a lateral biasing force against the handle, wherein the handle has a sufficiently loose fit on the pivot pin to allow the handle to be laterally rocked by a user against the lateral bias of the compression spring to permit the user to selectively move the handle laterally relative to the wider rear portion of the slot, wherein the handle is operatively connected to the frame selectively vertically moving the frame and the roller body relative to the cutting deck from a lowered operative position relative to the cutting deck in which the roller body engages the ground to a raised non-operative position relative to the cutting deck in which the roller body is above and out of contact with the ground, wherein the handle is within the narrower front portion of the slot when the roller body is in the lowered operative position thereof and is positively latched within the wider rear portion of the slot when the roller body is in the raised non-operative position to positively retain the roller body in the raised non-operative position, and wherein an upper end of the handle is sufficiently adjacent and close to an operator's seat on a lawn mower that carries the cutting deck to permit an operator to reach the upper end of the handle and move the handle while the operator is seated on the operator's seat.

2. The cutting deck of claim 1, wherein the roller body is made of plastic material and is sufficiently flexible to bend or deflect upon impact with a curb as the cutting deck climbs up over the curb and to then restore the plastic roller body to a normal shape thereof without damage once the plastic roller body passes the curb.

3. The cutting deck of claim 1, wherein the frame is movable on the cutting deck by pivoting about a substantially horizontal pivot axis, and wherein the spring comprises a torsion spring concentrically positioned around the pivot axis of the frame.

4. The cutting deck of claim 3, wherein the torsion spring has a first leg that is anchored or fixed to some portion of the cutting deck and a second leg overlying and bearing on top of the frame.

5. The cutting deck of claim 1, further including a pair of shafts nonrotatably fixed to opposite ends of the roller body.

6. The cutting deck of claim 5, further including a pair of cylindrical support hubs in which the shafts of the roller body are rotatably journalled.

7. The cutting deck of claim 6, wherein the support hubs are fixed to opposite sides of the frame.

8. The cutting deck of claim 1, wherein the pivot pin of the handle, the frame, and a top end of the handle are arranged relative to one another such that an operator pushes on the handle in a forward direction to lower a top end of the handle in order to lower the frame and roller body into its lowered operative position and such that the operator pulls on the handle in a rearward direction to lift the top end of the handle in order to lift the frame and roller body into its raised non-operative position, whereby the lowering and lifting movement of the top end of the handle is correlated to desired lowering and lifting movement of the frame and roller body.

9. An improved rotary cutting deck having at least one rotary cutting blade for mowing grass, wherein the improvement relates to a roller striper for pressing or laying down cut grass in a stripe behind the cutting deck, which comprises:

a) a frame pivotally carried on a rear of the cutting deck for motion about a frame pivot axis;

b) a roller body rotatably carried on the frame for rotation about a substantially horizontal rotational axis;

c) a spring acting between the cutting deck and the frame for pressing downwardly on the frame with a force sufficient to cause the roller body to lay the cut grass down; and d) a handle pivotally carried on the cutting deck for motion about a pivot axis that is different from the frame pivot axis, wherein the handle is operatively connected by a linkage to the frame for selectively pivoting the frame and the roller body relative to the cutting deck from a lowered operative position relative to the cutting deck in which the roller body engages the ground to a raised non-operative position relative to the cutting deck in which the roller body is above and out of contact with the ground, wherein the linkage between the handle and the frame includes a flexible member that is taut when the frame and roller body are in the raised non-operative position thereof and that has sufficient slack when the frame and roller body are in the lowered operative position thereof such that the spring force maintains the roller body in engagement with the ground and prevents the roller body from bouncing or bobbing over the ground as the cutting deck travels over the ground, and wherein an upper end of the handle is sufficiently adjacent and close to an operator's seat on a lawn mower that carries the cutting deck to permit an operator to reach the upper end of the handle and move the handle while the operator is seated on the operator's seat.

* * * * *